L. Lincoln,
Molasses Gate,
№ 105, Reissued Jan. 25, 1848.
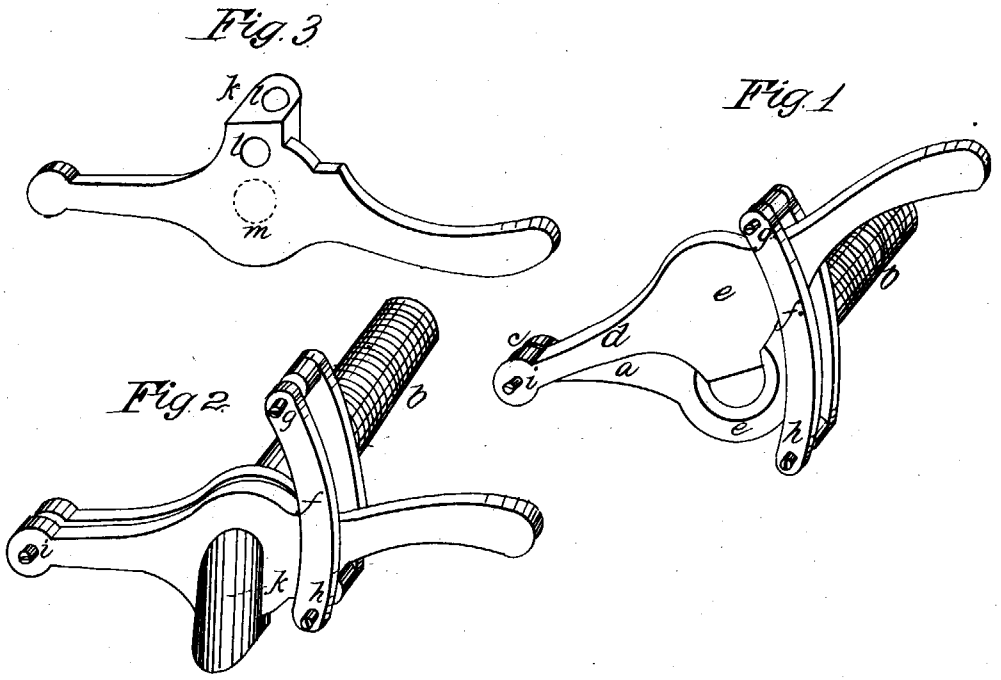
N. PETERS, PHOTO-LITHOGRAPHER, WASHINGTON, D. C.

UNITED STATES PATENT OFFICE.

LEVI LINCOLN, OF HARTFORD, CONNECTICUT.

IMPROVEMENT IN THE CONSTRUCTION OF MOLASSES-GATES AND COCKS FOR DRAWING LIQUORS.

Specification forming part of Letters Patent No. 2,342, dated November 10, 1841; Reissue No. 105, dated January 25, 1848.

*To all whom it may concern:*

Be it known that I, LEVI LINCOLN, of Hartford, in the county of Hartford and State of Connecticut, have invented new and useful Improvements in the Construction of Molasses-Gates and Cocks for Drawing Liquors; and I do hereby declare that the following is a full, clear, and exact description of the principle or character which distinguishes them from all other things before known, and of the manner of making, constructing, and using the same, reference being had to the accompanying drawings, making part of this specification, in which—

Figure 1 is a perspective view of the said improved gate for drawing molasses and thick liquids or semi-fluids; Fig. 2, a like representation of one intended for drawing water and other thin fluids, and Fig. 3 a like representation of the valve-lever reversed to exhibit the passage through which the liquor is discharged.

The same letters indicate like parts in all the figures.

In my improved gate or cock the delivery-aperture is opened and closed by a sliding valve at the end thereof, which makes part of a lever that turns on a fulcrum-pin, a segment-plate being used in combination therewith to keep the said lever-valve against the face of the delivery-aperture and prevent leakage; and when the said gate or cock is used for drawing thin liquors, the lever-valve thereof is formed with a projection or lip in front, in which the delivery-aperture is formed to give the liquid a downward direction as it leaves the instrument.

The nature of my invention in the said instrument consists in combining with the lever-valve of a stop cock or gate that turns on a fulcrum-pin a segment-plate so connected with the lever as to cause it to make pressure against the end of the delivery-aperture of the screw-tube, and thus resist the outward pressure of the contained liquid and prevent leakage; and my invention also consists in forming the said valve with a projecting lip in front, in which is formed a delivery-spout to give a downward direction to the liquid as it issues from the main or screw tube.

In the accompanying drawings, *b* represents the main or screw tube of the cock or gate, made in the usual manner, except that at the forward end it is formed with a projecting flange, *a*, at right angles with the axis of the tube, and on one side this flange extends out in the form of an arm, and to the outer extremity thereof the end *c* of the lever-valve *d* is secured by a screw, *i*, which forms the fulcrum on which the valve turns. On the opposite side the flange is formed in the segment of a circle to receive two screws, *g h*, that secure a segment-plate, *f*, over the valve to keep it up against the delivery end of the main pipe, which may be lined with a ring of leather, *e*, over which the valve slides. By turning the screws *g h* the pressure of the segment-plate *f* on the lever-valve can be increased or diminished at pleasure, to increase or decrease the pressure of the face of the valve against the end of the main or screw tube, thus insuring a close joint which will resist the outward pressure of the liquid and avoid leakage. The segment-plate *f* is the segment of a circle of which the fulcrum of the lever-valve is the center. When the lever-valve is turned down by taking hold of the outer extremity, which should have the form of a handle, the lower edge of the valve gradually closes the aperture, and in doing so cuts off all the liquid which might otherwise hang about the aperture, particularly with the thick fluids, such as molasses; but when the instrument is intended for drawing thin liquors—such as water—which would fly out of the main tube horizontally, the valve is formed with a lip or projection, *k*, in which is formed a curved hole, *l l*, that passes from the inner face to the lower edge of the lip in form somewhat like a quadrant, to deflect the liquid and give it a downward direction.

Instead of the quadrant-hole *l l*, the inside of the lip may be cut out entirely to form simply a recess, the outer part of which will deflect the liquid and turn it downward. When made with the quadrant-hole, where the hole passes through the face of the valve, it should be so situated as to correspond with the aperture of the main tube when the lever is thrown up. The dotted circle *m*, Fig. 3, represents the part of the face of the valve which lies opposite the main tube when closed.

It will on reflection become apparent that the segment for keeping the valve against the face of the main tube may be variously arranged without varying the purpose for which it is used or the principle of this part of my invention—as, for instance, instead of the segment-plate *f*, the lever of the valve can be formed with a projecting lip that will embrace the segment part of the flange *a*, and there provided with a set-screw or spring which will draw the face of the valve againt the end of the tube; or, instead of the lip embracing the segment-flange, the flange may be made with a segment-slot, through which a screw attached to the valve can pass and move as the valve is opened or closed, a screw-nut being used below the flange to make the required pressure; or, instead of this, the segment-plate may be placed on the opposite side of the fulcrum-pin, and the lever of the valve extended to it, with a temper-screw or strong spring to make pressure on the segment, and thus press the face of the valve against the end of the main tube. It is believed that these modifications will be sufficient to show the variety of changes that may be made in the mode of application without changing the principle of the invention as pointed out above.

What I claim as my invention, and desire to secure by Letters Patent, is—

1. The lever-valve of stop cocks or gates, substantially such as herein described, in combination with a segment-plate or the equivalents thereof, substantially as herein described, whereby the valve can be made with a close joint to resist the outward pressure of the contained liquid.

2. Forming a lip on the valve with an aperture or recess to deflect the liquid and give it a downward direction, when this is combined with the main tube that discharges horizontally, as herein described.

LEVI LINCOLN.

Witnesses:

GEO. S. LINCOLN,

EDWARD GOODMAN.